(12) United States Patent
Voelker et al.

(10) Patent No.: US 11,164,709 B2
(45) Date of Patent: Nov. 2, 2021

(54) DEVICES FOR LIMITING SWITCH POSITIONS FOR ELECTRICAL DEVICES

(71) Applicant: SIGNIFY HOLDING B.V., Eindhoven (NL)

(72) Inventors: Chris Voelker, Lexington, KY (US); Michael Winslett, Fairburn, GA (US)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/268,067

(22) Filed: Feb. 5, 2019

(65) Prior Publication Data

US 2020/0251293 A1 Aug. 6, 2020

(51) Int. Cl.
*H01H 15/10* (2006.01)
*H01H 9/02* (2006.01)
*H02G 3/08* (2006.01)
*H01H 19/50* (2006.01)
*F21V 23/04* (2006.01)

(52) U.S. Cl.
CPC .............. *H01H 15/10* (2013.01); *H01H 9/02* (2013.01); *H01H 19/50* (2013.01); *H02G 3/081* (2013.01); *F21V 23/04* (2013.01); *H01H 2223/038* (2013.01)

(58) Field of Classification Search
CPC .......... H01H 15/10; H01H 19/50; H01H 9/02; H01H 2223/038; H02G 3/081; F21V 23/04; F21V 19/002; F21V 15/01; H05B 45/20; H05B 47/10; F21S 8/026; F21S 10/02; Y02B 20/30; F21Y 2115/10
USPC .......... 200/43.16, 43.18, 43.19, 43.21, 43.22, 200/333
See application file for complete search history.

(56) References Cited

U.S. PATENT DOCUMENTS

| | | | | |
|---|---|---|---|---|
| 10,091,855 B2* | 10/2018 | Van Winkle | ........... | H05B 47/10 |
| 10,462,871 B2* | 10/2019 | Van Winkle | ............ | F21S 8/026 |
| 2014/0291132 A1* | 10/2014 | Todd | ........................ | H01H 9/02 |
| | | | | 200/333 |
| 2015/0262771 A1* | 9/2015 | Haraguchi | ........... | H01H 13/705 |
| | | | | 200/333 |

* cited by examiner

Primary Examiner — Lheiren Mae A Caroc

(57) ABSTRACT

A device for limiting movement of an operator of at least one switch of a light fixture can include a body. The device can also include at least one fixture coupling feature disposed on the body, where the at least one fixture coupling feature is configured to couple to at least one device coupling feature of the light fixture. The body, when coupled to the light fixture, can be configured to limit the movement of a first operator of a first switch of the at least one switch.

19 Claims, 11 Drawing Sheets

DEVICES FOR LIMITING SWITCH POSITIONS FOR ELECTRICAL DEVICES

TECHNICAL FIELD

Embodiments described herein relate generally to electrical devices, and more particularly to systems, methods, and devices for limiting positions of switches on electrical devices (e.g., light fixtures).

BACKGROUND

Light fixtures can have a number of different shapes, sizes, configurations, and light sources. In some cases, these light fixtures can include one or more switches disposed on an outer surface or some other part of the light fixture that controls an aspect (e.g., lumens, correlated color temperature (CCT)) of light output by such light fixtures. By adjusting the position of a switch, a user can control that aspect of the light output by the light fixture. For electrical devices in general, switches can be used to control additional aspects (e.g., volume, modes of operation) of those electrical devices.

SUMMARY

In general, in one aspect, the disclosure relates to a device for limiting movement of an operator of at least one switch of a light fixture. The device can include a body and at least one fixture coupling feature disposed on the body, where the at least one fixture coupling feature is configured to couple to at least one device coupling feature of the light fixture. The body, when coupled to the light fixture, can be configured to limit a first movement of a first operator of a first switch of the at least one switch.

In another aspect, the disclosure relates to an electrical device. The electrical device can include an enclosure having at least one enclosure wall and at least one first device coupling feature. The electrical device can also include a first switch disposed on the at least one enclosure wall, where the first switch comprises a first operator. The electrical device can further include a first device coupled to the at least one enclosure wall. The first device can include a first body and at least one first enclosure coupling feature disposed on the first body, where the at least one first enclosure coupling feature couples to the at least one first device coupling feature of the enclosure. The first body, when coupled to the enclosure, can limit a first movement of the first operator of the first switch.

These and other aspects, objects, features, and embodiments will be apparent from the following description and the appended claims.

BRIEF DESCRIPTION OF THE DRAWINGS

The drawings illustrate only example embodiments of devices for limiting switch positions for electrical devices and are therefore not to be considered limiting of its scope, as devices for limiting switch positions for electrical devices may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
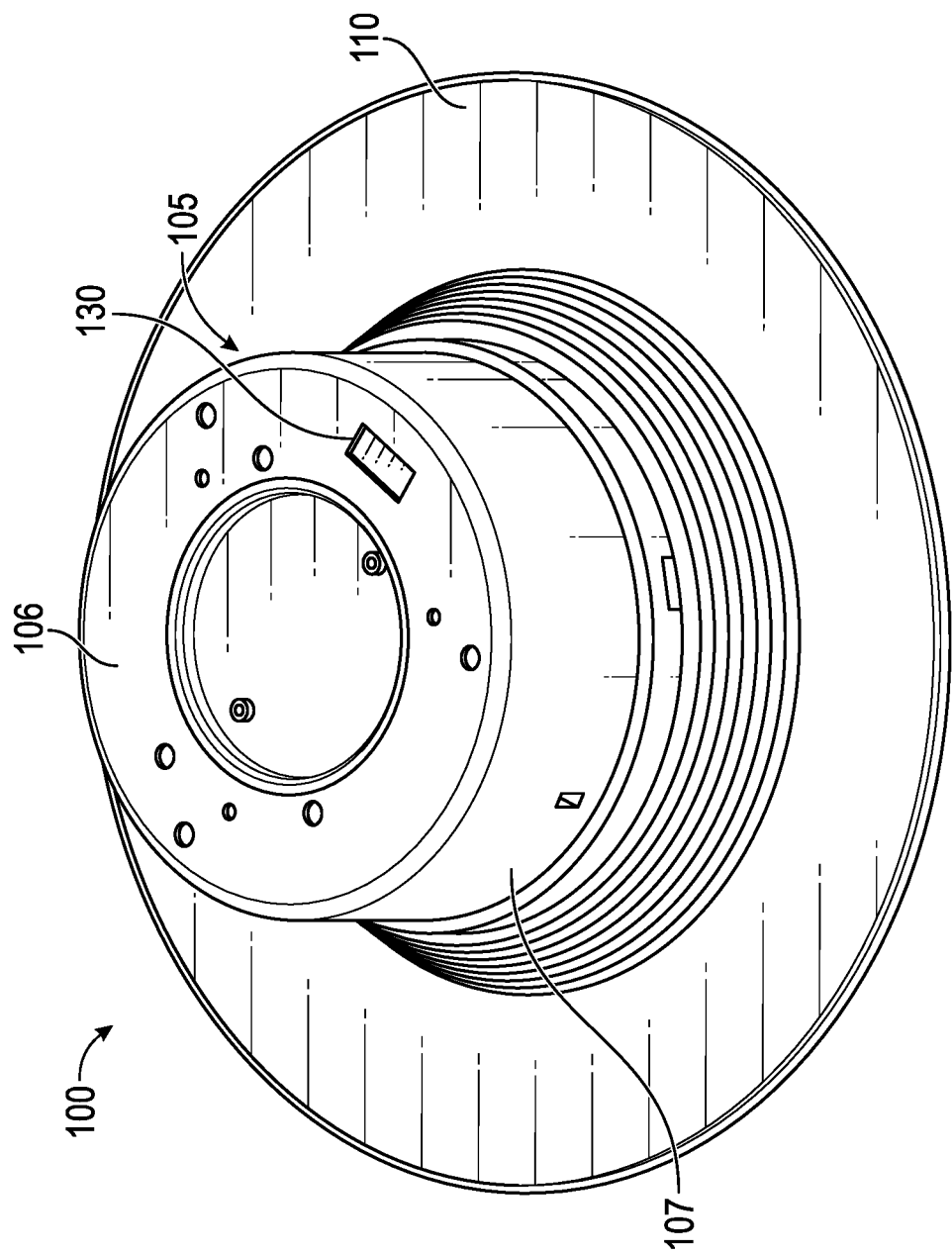
FIG. 1 shows a light fixture with a switch currently used in the art.

The example embodiments discussed herein are directed to systems, methods, and devices for limiting switch positions for electrical devices. Such electrical devices can include light fixtures. In such a case, example embodiments can be used with any type of light fixture. For instance, example devices can be used with new light fixtures or retrofitted to existing light fixtures. Further, light fixtures with which example embodiments can be used can be located in any environment (e.g., indoor, outdoor, high humidity, low temperature, sterile, high vibration).

Further, light fixtures described herein can use one or more of a number of different types of light sources, including but not limited to light-emitting diode (LED) light sources, organic LEDs, fluorescent light sources, organic LED light sources, incandescent light sources, and halogen light sources. Therefore, light fixtures described herein should not be considered limited to having a particular type of light source. When a light fixture described herein uses LED light sources, those LED light sources can include any type of LED technology, including, but not limited to, chip on board (COB) and discrete die.

A light fixture described herein can be any type fixture, including but limited to a troffer, a down can fixture, an under cabinet light fixture, a pendant light, a table lamp, a floodlight, a spot light, and a high-bay fixture. As described herein, the example devices are described as limiting the movement of an operator of a switch. As defined herein, the term "limiting" can be passive or active. In the passive definition, "limiting" can be where the device prevents access to the operator of the switch. In the active definition, "limiting" can be where the device physically prevents the operator of the switch from moving, in whole or in part.

Example devices described herein can employ active and/or passive measures in limiting the movement of an operator of a switch.

Also, example embodiments can be used with devices other than light fixtures. Specifically, any electrical device that includes a physical switch can use example devices described herein. Examples of such electrical devices can include, but are not limited to, an alarm clock, a stereo, a dimmer control switch, a digital display, a television set, an appliance (e.g., a clothes dryer, a dish washing machine, a toaster, an oven), and a motor control station.

A user may be any person that interacts with an electrical device. Examples of a user may include, but are not limited to, a homeowner, a tenant, a landlord, a property manager, an engineer, an electrician, an instrumentation and controls technician, a consultant, a contractor, and a manufacturer's representative. Example devices for limiting switch positions for electrical devices (including components thereof) described herein can be made of one or more of a number of materials, including but not limited to plastic, thermoplastic, copper, aluminum, rubber, stainless steel, and ceramic.

In certain example embodiments, light fixtures that include devices for limiting switch positions are subject to meeting certain standards and/or requirements. For example, the National Electric Code (NEC), the National Electrical Manufacturers Association (NEMA), the International Electrotechnical Commission (IEC), the California Energy Commission (CEC), Underwriters Laboratories (UL), and the Institute of Electrical and Electronics Engineers (IEEE) set standards as to electrical enclosures (e.g., light fixtures), wiring, and electrical connections. Use of example embodiments described herein meet such standards when required.

Any electrical devices (e.g., light fixtures), or components thereof (e.g., example devices for limiting switch positions), described herein can be made from a single piece (e.g., as from a mold, injection mold, die cast, 3-D printing process, extrusion process, stamping process, or other prototype methods). In addition, or in the alternative, an electrical device (or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, tabs, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting, or other similar terms. Such terms are merely meant to distinguish various elements and/or features within a component or device and are not meant to limit the capability or function of that particular element and/or feature. For example, a feature described as a "coupling feature" can couple, secure, fasten, abut, and/or perform other functions aside from merely coupling.

A coupling feature (including a complementary coupling feature) as described herein can allow one or more components and/or portions of an example device to become coupled, directly or indirectly, to another portion of the device and/or a component (e.g., an enclosure wall) of the electrical device. A coupling feature can include, but is not limited to, a snap, a clamp, a portion of a hinge, an aperture, a recessed area, a protrusion, a slot, a tab, a spring clip, a tab, a detent, and mating threads. One portion of an example device can be coupled to another component of the device or another component of the electrical device by the direct use of one or more coupling features.

In addition, or in the alternative, a portion of an example device can be coupled to another portion of the device or another component of the electrical device using one or more independent devices that interact with one or more coupling features disposed on a component of the electrical device. Examples of such devices can include, but are not limited to, a pin, a hinge, a fastening device (e.g., a bolt, a screw, a rivet), epoxy, a sealing member (e.g., an O-ring, a gasket), glue, adhesive, tape, and a spring. One coupling feature described herein can be the same as, or different than, one or more other coupling features described herein. A complementary coupling feature (also sometimes called a corresponding coupling feature) as described herein can be a coupling feature that mechanically couples, directly or indirectly, with another coupling feature.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of devices for limiting switch positions for electrical devices be described more fully hereinafter with reference to the accompanying drawings, in which example embodiments of devices for limiting switch positions for electrical devices are shown. devices for limiting switch positions for electrical devices may, however, be embodied in many different forms and should not be construed as limited to the example embodiments set forth herein. Rather, these example embodiments are provided so that this disclosure will be thorough and complete, and will fully convey the scope of devices for limiting switch positions for electrical devices to those or ordinary skill in the art. Like, but not necessarily the same, elements (also sometimes called components) in the various figures are denoted by like reference numerals for consistency.

Terms such as "first", "second", "top", "bottom", "outer", "inner", "height", "width", "thickness", "lower", "upper", "side", "front", "distal", "proximal", and "within" are used merely to distinguish one component (or part of a component or state of a component) from another. Such terms are not meant to denote a preference or a particular orientation, and are not meant to limit embodiments of devices for limiting switch positions for electrical devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a top-side-perspective view of a light fixture 100 with a switch 130 currently used in the art. In this case, the light fixture 100 is in the form of a can light (also called a down can light). The light fixture 100 of FIG. 1 has a trim 110 that is coupled to a bottom portion of a housing 105. The housing 105 of the light fixture 100 can have one or more walls. In this example, since the housing 105 is generally cylindrically shaped, the housing has a single side wall 107 and a substantially planar top wall 106.

The light fixture 100 of FIG. 1 also includes the switch 130. In this case, the switch 130 is disposed on or through the top wall 106 of the housing 105. In any case, the switch 130 is accessible to a user when the top wall 106 of the housing 105 is accessible to the user. The light fixture 100 can include a single switch 130 or multiple switches 130. A switch 130 can be located on an outer surface of a wall of the housing 105, within an aperture in a wall of the housing 105, on an inner surface of a wall of the housing 105, inside the housing 105, or at any other location with respect to the housing 105. For example, a switch 130 can be disposed on an outer surface of the trim 110. Other examples of the location of a switch are shown below with respect to FIGS. 2 and 3.

Figure 4:
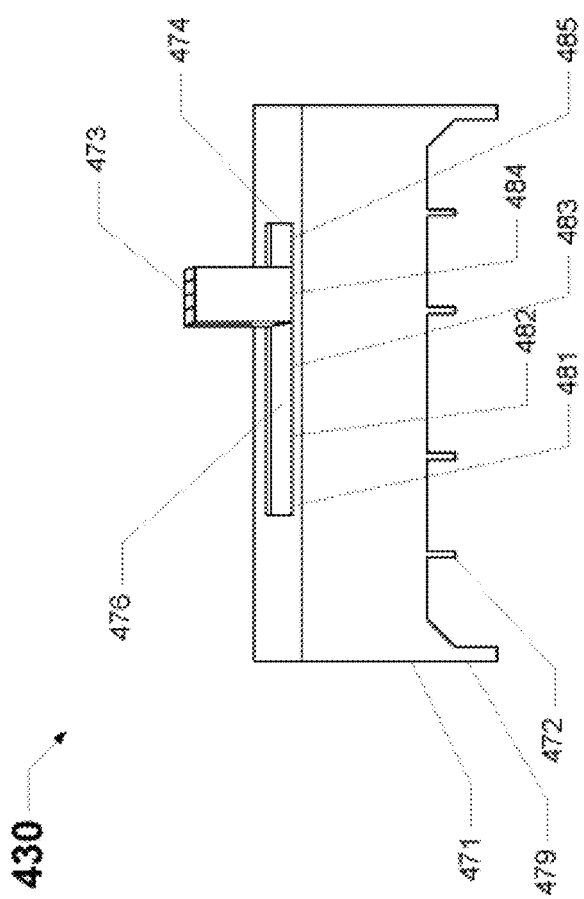
FIG. 4 shows a switch that can be used with a light fixture and whose positions can be limited using example embodiments.
Figure 5:
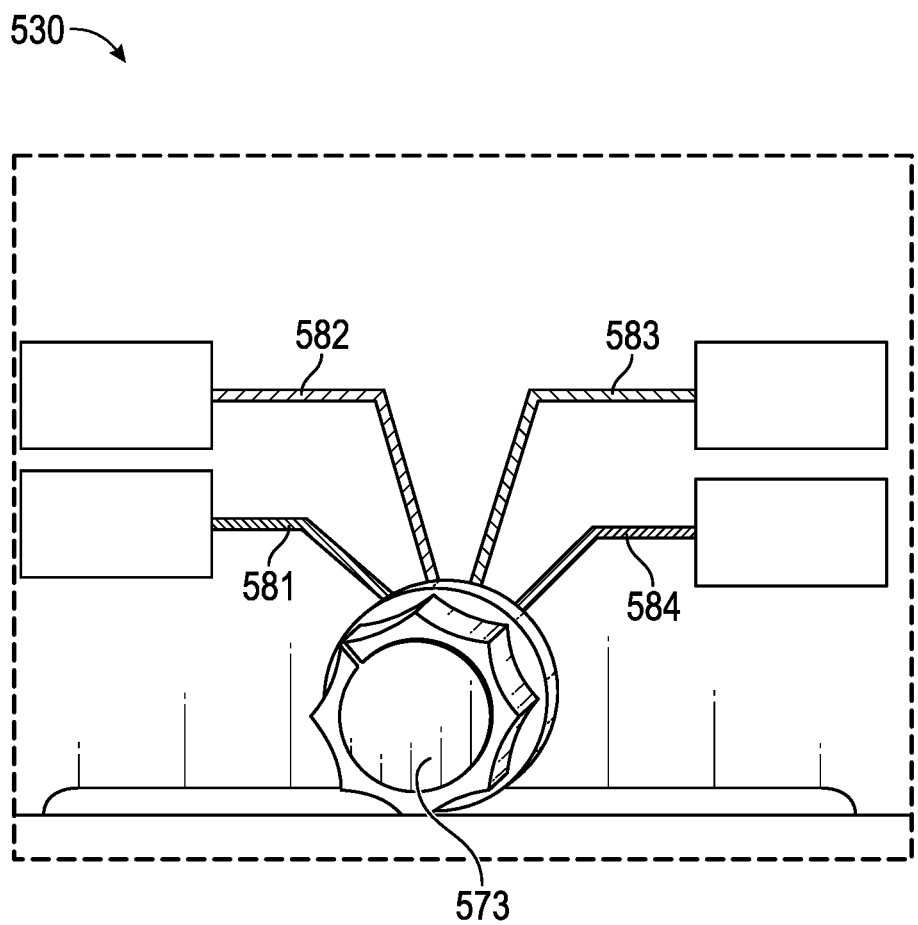
FIG. 5 shows another switch that can be used with a light fixture and whose positions can be limited using example embodiments.

A switch 130 can be any of a number of types of switches, including but not limited to a DIP switch, a SIPP switch, a rocker switch, a reed switch, a magnetic switch, a rotary switch, a rotary dial (as shown in FIG. 5 below), a selector switch, a slide switch (as shown in FIG. 4 below), a snap switch, a thumbwheel, a toggle switch, a keypad, and a pushbutton. Regardless of the type and/or configuration of a switch 130, the switch 130 has an operator that moves between multiple positions at the direction of a user. The multiple positions of a switch 130 can be discrete or continuous.

A switch 130 can be used to control one or more characteristics of the light fixture 100. As one example, a switch 130 can be used to control the CCT of the light output by the light sources of the light fixture 100. As another example, a switch 130 can be used to control the amount of lumens output by the light sources of the light fixture 100. As yet another example, a switch 130 can be used to control the amount of power delivered to the light sources (or some other component, such as a driver) of the light fixture 100. As yet another example, a switch 130 can be used to select a communication protocol, such as a communication protocol for a wireless transceiver located within the light fixture 100.

Figure 2:
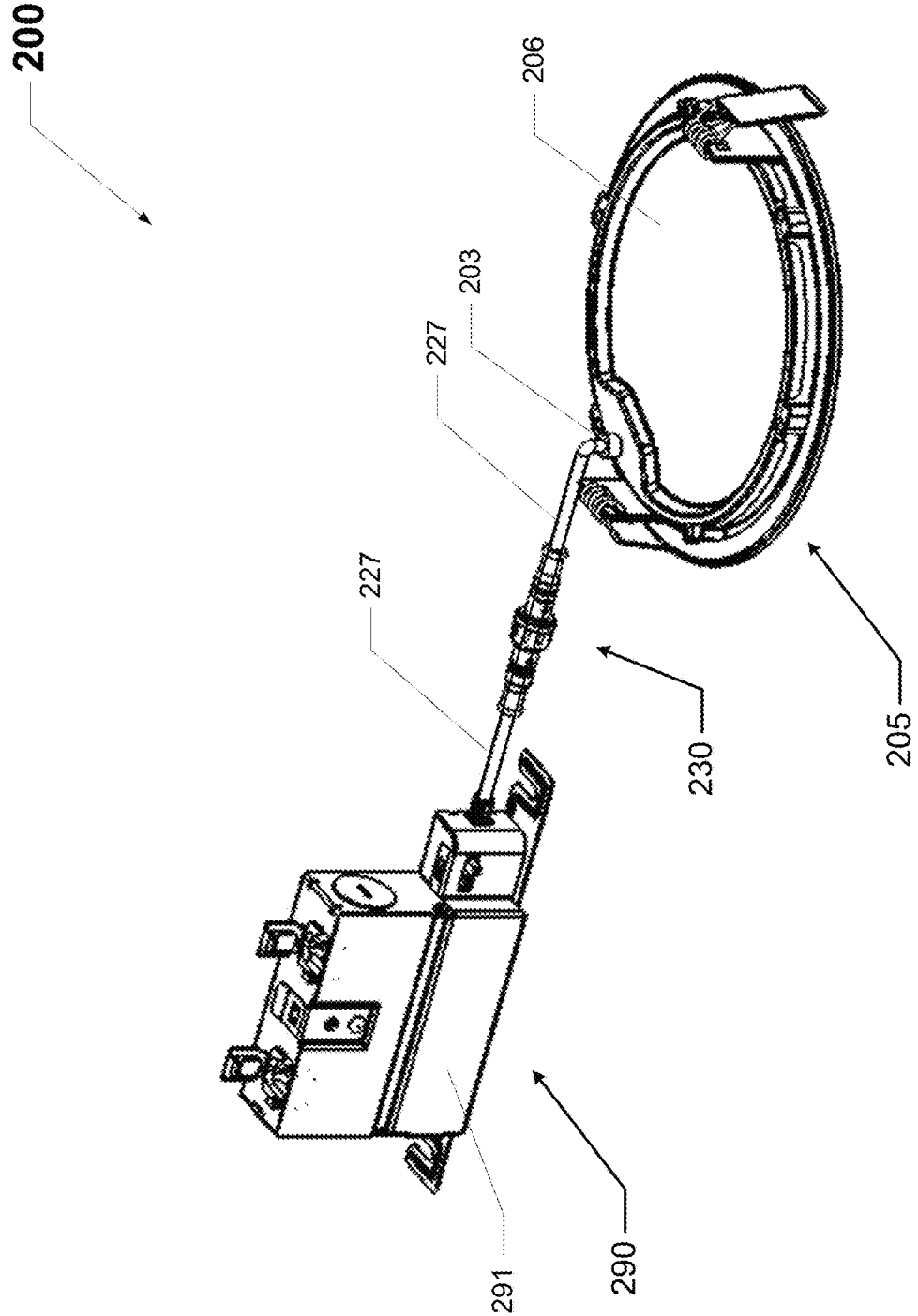
FIG. 2 shows another light fixture with a switch currently used in the art.

FIG. 2 shows a top-side-perspective view of another light fixture 200 with a switch 230 currently used in the art. Referring to FIGS. 1 and 2, the light fixture 200 of FIG. 2 includes a housing 205 and a remotely located junction box 290. In this case, the light fixture 200 is a surface-mounted light fixture, and so the housing 205 has a low profile. An electrical cable 227 extends through a wiring aperture 203 in the cover 206 (also called a top wall 206) of the housing 205. The electrical cable 227 can include one or more electrical conductors to transfer power, control, communication, data, and/or any other type of electrical signals. One end of the electrical cable 227 is connected to one or more components (e.g., light sources) disposed on and/or within the housing 205 of the light fixture 200, and the other end of the electrical cable 227 is connected to one or more components (e.g., a driver) disposed within the junction box 290.

The housing 205 of the light fixture 200 can be installed in or on any of a number of structure members (e.g., drywall that forms a ceiling, a ceiling tile). The junction box 290 is located behind the structure member and includes one or more walls 291 to enclose one or more electrical components (e.g., a driver). As discussed above, the opposing end of the electrical cable 227 is coupled to one or more of those electrical components disposed in the junction box 290. In this way, the electrical cable 227 electrically couples one or more electrical components in the junction box 290 with one or more electrical components in or on the housing 205. When the housing 205 is mounted in its installed location (e.g., the ceiling), the entire electrical cable 227 (and so also the switch 231) is behind the structure member (e.g., ceiling) and is inaccessible. Similarly, when the housing 205 is mounted in its installed location (e.g., the ceiling), the junction box 290 can be inaccessible. When the housing 205 is removed from its installed location, the junction box 290 and the electrical cable 227 (and so also the switch 231) can be accessible.

With the embodiment discussed above with respect to FIG. 1, the switch 130 is located on the housing 105 of the light fixture 100. Here, the switch 230 is located outside of the housing 205 of the light fixture 200. Specifically, in this case, the switch 230 is in-line with the electrical cable 227. The switch 230 can be substantially the same as the example switches discussed above. For instance, the switch 230 can have one or more coupling features (e.g., terminal points) that are used to couple to one or more electrical conductors of one or more electrical cables 227. As another example, the switch 230 can have an actuator having multiple positions.

Figure 3:
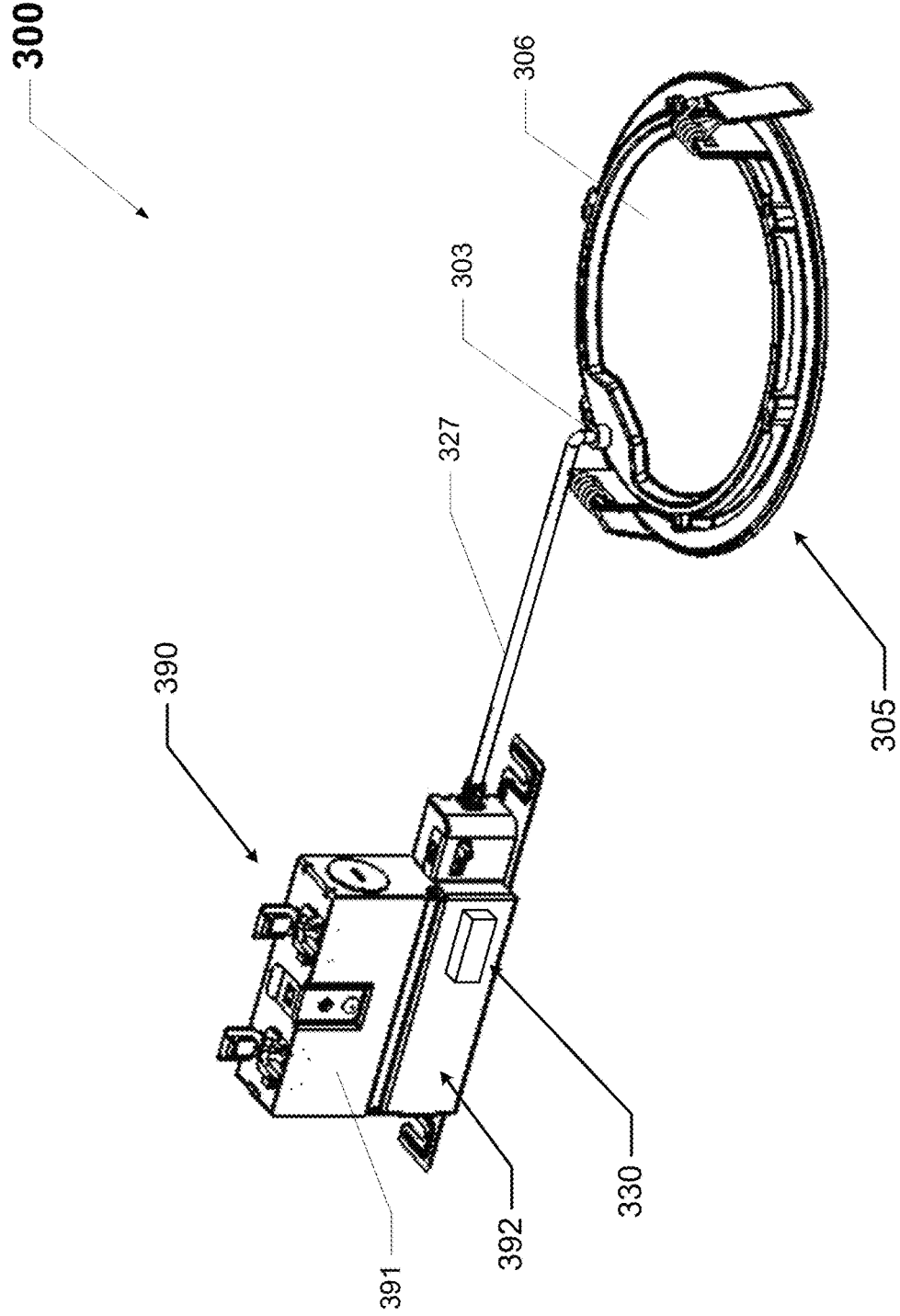
FIG. 3 shows yet another light fixture with a switch currently used in the art.

FIG. 3 shows yet another light fixture with a switch currently used in the art. Referring to FIGS. 1 through 3, the light fixture 300 of FIG. 3 is substantially the same as the light fixture 200 of FIG. 2, except that the switch 330 of the light fixture 300 of FIG. 3 is in a different location separate from the housing 305. Specifically, the light fixture 300 of FIG. 3 includes a housing 305 and a remotely located junction box 390. In this case, the light fixture 300 is a surface-mounted light fixture, and so the housing 305 is low profile. The cover 326 of the housing 305 is shown in FIG. 3. An electrical cable 327 extends through a wiring aperture 303 in the cover 326. The electrical cable 327 can include one or more electrical conductors to transfer power, control, communication, data, and/or any other type of electrical signals. One end of the electrical cable 327 is connected to one or more components (e.g., light sources) disposed on and/or within the housing 305 of the light fixture 300, and the other end of the electrical cable 327 is connected to one or more components (e.g., light sources) disposed on and/or within the junction box 390. When the housing 305 is mounted in its installed location (e.g., a ceiling), the entire electrical cable 327 can be inaccessible to a user. When the housing 305 is removed from its installed location, the electrical cable 327 and the junction box 390 can be accessible.

The junction box 390 includes one or more walls 391 to enclose one or more electrical components (e.g., a driver, the switch 330). In this case, one of the walls of the junction box 390 is removed to show the switch 330 disposed within the cavity 392 formed by the walls 391 of the junction box 390. An opposing end of the electrical cable 327 is coupled to one or more of those electrical components disposed in the junction box 390. In this way, the electrical cable 327 electrically couples one or more electrical components in the junction box 390 with one or more electrical components in or on the housing 305. In this case, the switch 330 is disposed within the junction box 390. When the housing 305 is mounted in its installed location (e.g., a ceiling), the junction box 390 (and so also the switch 330) can be inaccessible to a user. When the housing 305 is removed from its installed location, the junction box 390 (and so also the switch 330) can be accessible to a user.

FIG. 4 shows a switch 430 that can be used with a light fixture and whose positions can be limited using example embodiments. Referring to FIGS. 1 through 4, the switch 430 of FIG. 4 is a slide switch. The switch 430 has a body 471 and a number of coupling features 472 (in this case, pins) disposed on the bottom of the body 471 that allow the switch 430 to become electrically coupled to an electrical connector and/or some other coupling feature of a light fixture. In some cases, adjacent to the coupling features 472 can be disposed one or more mechanical coupling features 479 (e.g., tabs, posts).

In such a case, mechanical coupling features 479 can act as guides to properly position and align the coupling features 472 of the switch 430 relative to an electrical connector and/or some other coupling feature of a light fixture. At the top end of the body 471 of the switch 430 is an actuator 473 that extends outward from a plate 476. The plate 476 is disposed within the body 471 and has a length that is less than the length of the body 471. The plate 476 also corresponds to a slot 474 that traverses the top end of the body 471. The actuator 473 extends through the slot 474 and can be accessible by a user.

The switch 430 can include a number of detents and/or other features to limit or create discrete stopping locations for the actuator 473 (and so also the plate 476) along the length of the slot 474. Each of these detents and/or other features can be associated with a certain value of a variable that affects the operation of the light fixture to which the switch 430 is coupled. For example, if the switch 430 is used to select a CCT, the left end 481 of the slot 474 can be associated with 5000 K, detent 482 can be associated with 4000 K, detent 483 can be associated with 3500 K, detent 484 can be associated with 3000 K, and right end 485 of the slot 474 can be associated with 2700 K. Movement of the actuator 473 of the switch 430 can be limited (e.g., held in a single position, held within a limited range of positions) by an example device. Alternatively, an example device can guard the actuator 473 and prevent a user from manipulating the actuator 473.

FIG. 5 shows another switch 530 that can be used with a light fixture and whose positions can be limited using example embodiments. Referring to FIGS. 1 through 5, the switch 530 of FIG. 5 is a rotary dial. The switch 530 of FIG. 5 includes an actuator 573 that can be rotated by a user between four discrete positions (position 581, position 582, position 583, and position 584). Movement of the actuator 573 of the switch 530 can be limited (e.g., held in a single position, held within a limited range of positions) by an example device. Alternatively, an example device can guard the actuator 573 and prevent a user from manipulating the actuator 573.

Figure 6A:
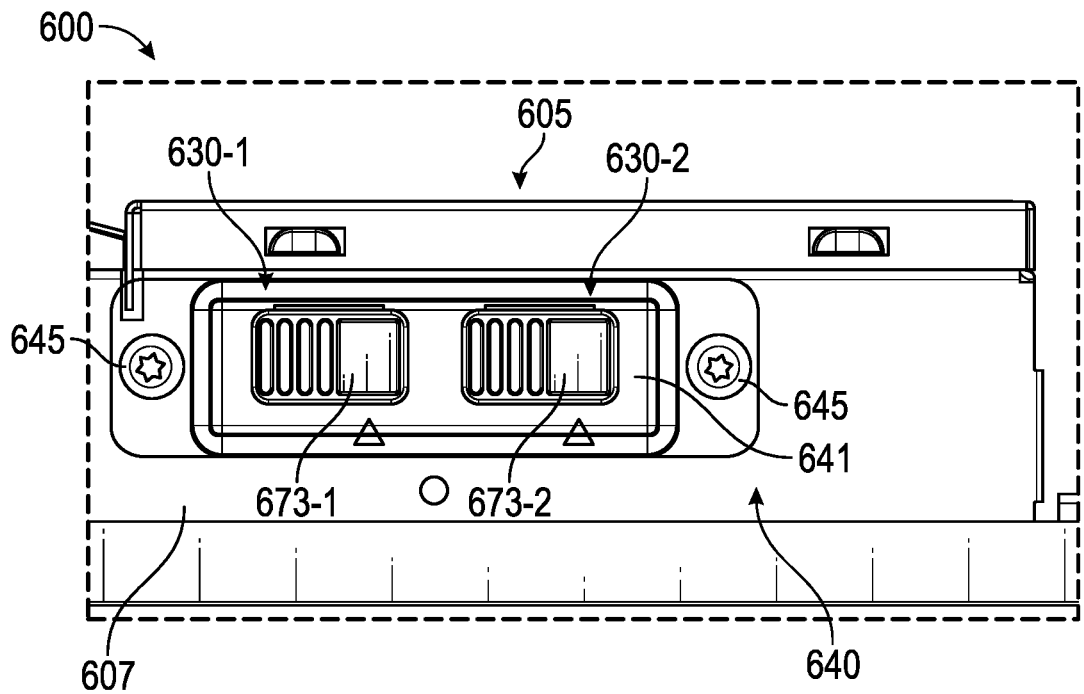
FIGS. 6A and 6B show a light fixture that includes a device for limiting switch positions in accordance with certain example embodiments.
Figure 6B:
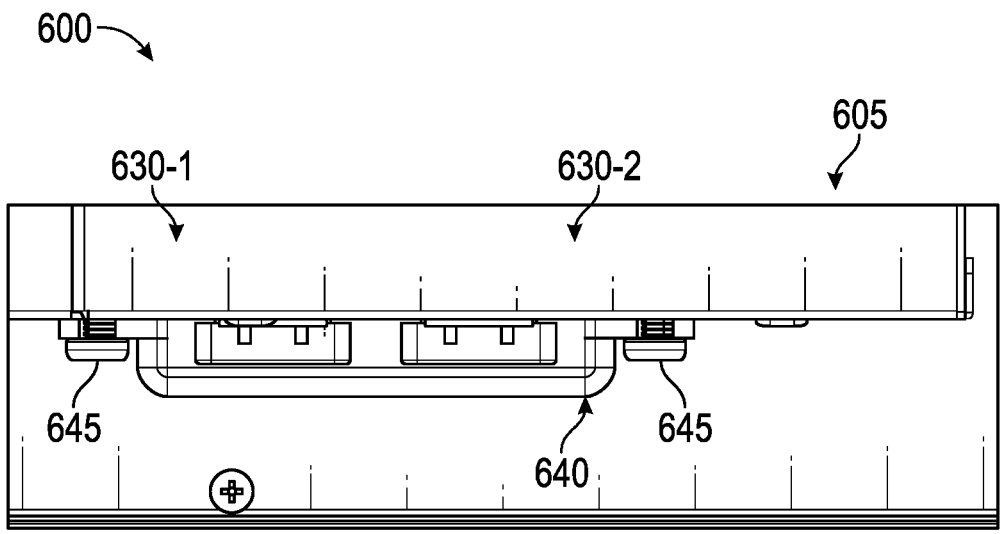

FIGS. 6A and 6B show a light fixture 600 that includes a device 640 for limiting switch positions in accordance with certain example embodiments. Specifically, FIG. 6A shows a side view of a portion of the light fixture 600, and FIG. 6B shows a top view of a portion of the light fixture 600. Referring to FIGS. 1 through 6B, the light fixture 600 includes two switches (switch 630-1 and switch 630-2) disposed on a side wall 607 of the housing 605. In this case, switch 630-1 and switch 630-2 are disposed next to each other.

Switch 630-1 and switch 630-2 are configured substantially identically relative to each other. In this case, switch 630-1 and switch 630-2 are slide switches having multiple (e.g., three) discrete positions. Switch 630-1 can be used to control one aspect (e.g., lumen output) of the light fixture 600, and switch 630-2 can be used to control another aspect (e.g., CCT) of the light fixture 600.

The light fixture 600 also includes a single device 640 that is used to limit the movement of the operator 673-1 of switch 630-1 and the operator 673-2 of switch 630-2. In this case, the device 640 is a cover having a body 641 that completely covers the portions (e.g., operator 673-1, operator 673-2) of switch 630-1 and switch 630-2 that are exposed and otherwise accessible to a user. In other words, in this case, the device 640 prevents access by a user to the operator 673-1 of switch 630-1 and the operator 673-2 of switch 630-2, thereby indirectly (passively) limiting the movement of the operator 673-1 of switch 630-1 and the operator 673-2 of switch 630-2 without physically and directly restricting the movement of operator 673-1 of switch 630-1 and the operator 673-2 of switch 630-2.

The device 640 includes multiple (in this case, two) coupling features (in this case, apertures) that allow the device 640 to be coupled to the side wall 607 of the housing 605 of the light fixture 600. The coupling features of the device 640 are configured to complement coupling features (also apertures in this case) disposed in the side wall 607 of the housing 605. Disposed within each of the apertures in the device 640 and the side wall 607 of the housing 605 in this case is an additional coupling feature 645 (in this case, a fastening device, such as a screw or rivet). Each coupling feature 645 can be configured to be removable (e.g., a screw with a standard head). Alternatively, each coupling feature 645 can be configured to be permanently affixed (e.g., a rivet, a screw with a non-standard head). This latter case makes the device 640 tamper-proof, which prevents a user's removal of the device 640 to allow the user access to switch 630-1 and/or switch 630-2.

In certain example embodiments, the device 640 is configured to be see-through or transparent, allowing a user to view switch 630-1 and switch 630-2 without being able to manipulate the operator 673-1 of switch 630-1 and the operator 673-2 of switch 630-2. In this way, the user can see the position in which the operator 673-1 of switch 630-1 and the operator 673-2 of switch 630-2 are set. Since the device 640 in this case acts as a cover, to the extent that a portion (e.g., the operator 673-1) of a switch 630-1 protrudes outward from the side wall 607 of the housing 605, the body 641 of the device 640 can be configured (e.g., have corresponding protrusions, have an overall protrusion) to cover such outward-extending features of switch 630-1 and switch 630-2. The body (e.g., body 641) of an example device described herein can be planar (two-dimensional). Alternatively, as shown in FIGS. 6A and 6B, the body of an example device can be three-dimensional.

Figure 7A:
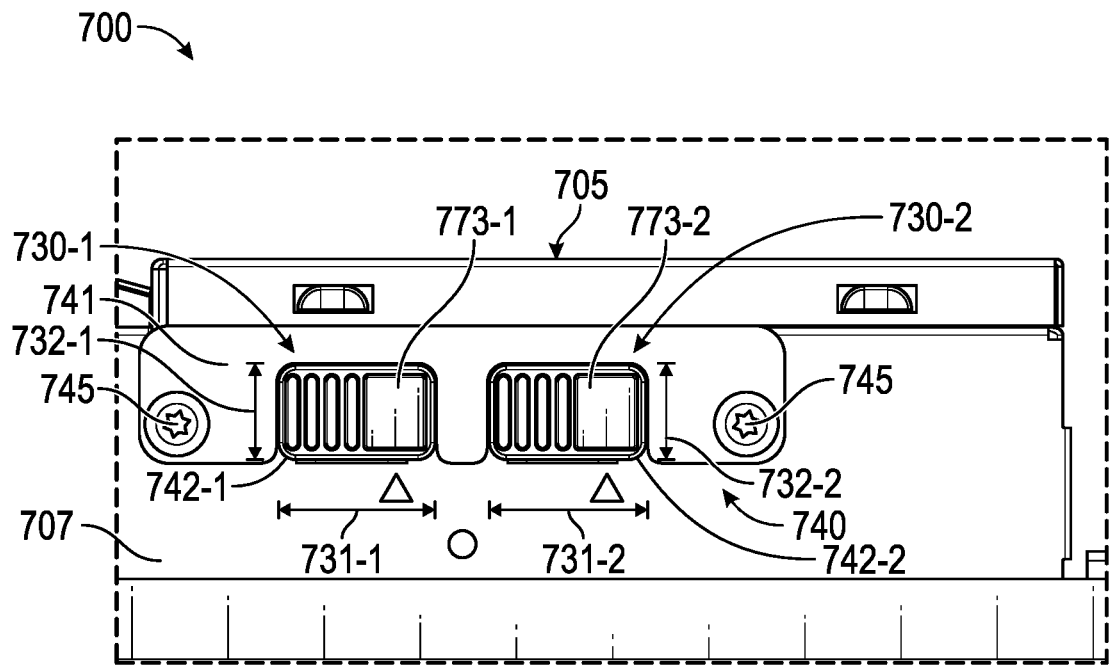
FIGS. 7A and 7B show a light fixture that includes another device for limiting switch positions in accordance with certain example embodiments.
Figure 7B:
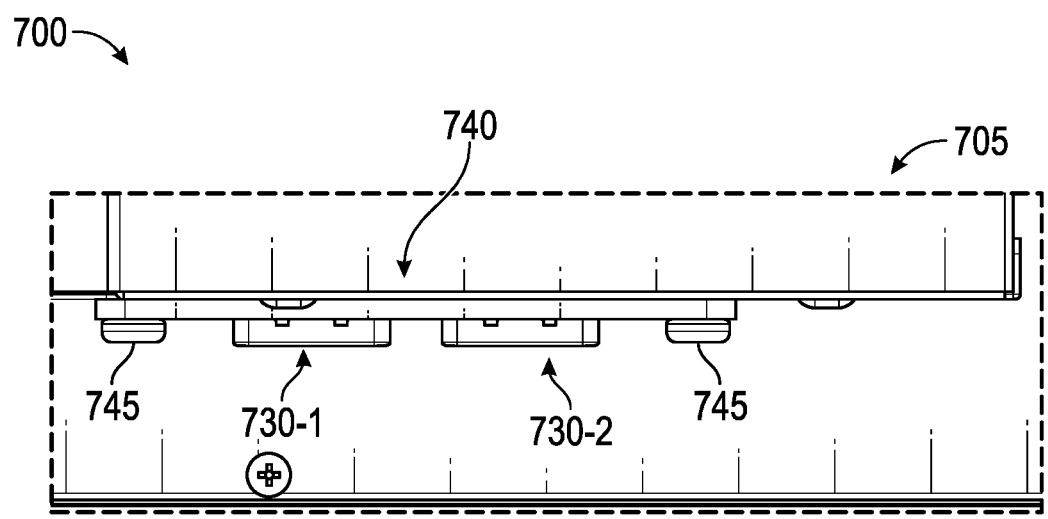

FIGS. 7A and 7B show a light fixture that includes another device for limiting switch positions in accordance with certain example embodiments. Specifically, FIG. 7A shows a side view of a portion of the light fixture 700, and FIG. 7B shows a top view of a portion of the light fixture 700. Referring to FIGS. 1 through 7B, the light fixture 700 includes two switches (switch 730-1 and switch 730-2)

disposed on a side wall 707 of the housing 705. In this case, switch 730-1 and switch 730-2 are disposed next to each other.

Switch 730-1 and switch 730-2 are configured substantially identically relative to each other and to the switches of FIGS. 6A and 6B. In this case, switch 730-1 and switch 730-2 are slide switches having multiple (e.g., three) discrete positions. Switch 730-1 can be used to control one aspect (e.g., lumen output) of the light fixture 700, and switch 730-2 can be used to control another aspect (e.g., CCT) of the light fixture 700.

The light fixture 700 also includes a single device 740 that is used to limit the movement of the operator 773-1 of switch 730-1 and the operator 773-2 of switch 730-2. In this case, the device 740 is a plate having a body 741 that includes one or more apertures (e.g., aperture 742-1, aperture 742-2) that traverse the body 741. Each such aperture is configured to have disposed therein an operator of at least one switch. In this example, there are two apertures (aperture 742-1, aperture 742-2) that traverse the body 741 of the device 740. Aperture 742-1 has disposed therein the operator 773-1 of switch 730-1, and aperture 742-2 has disposed therein the operator 773-2 of switch 730-2.

An aperture (e.g., aperture 742-1) can be located at any place with respect to the body 741 of the device 740. For example, in this case, aperture 742-1 and aperture 742-2 are disposed along the bottom edge of the body 741 of the device 740, so that aperture 742-1 and aperture 742-2 are open ended at the bottom. Alternatively, an aperture can be disposed within the body 741 of the device 740 so that the edges defining the aperture create a closed shape.

The shape and size of an aperture (e.g., aperture 742-1) can be designed to perform the function of limiting (in this case, actively) the movement of the operator of a switch so that only one or more certain selections (instead of all selections) of the operator are available to a user. In other words, in this case, while the device 740 allows access by a user to the operator 773-1 of switch 730-1 and the operator 773-2 of switch 730-2, the device 740 actively (physically) restricts (limits) the movement of the operator 773-1 of switch 730-1 and the operator 773-2 of switch 730-2.

In this case, aperture 742-1 in the body 741 of the device 740 has a shape and size that prevents the operator 773-1 of switch 730-1 from moving at all. Specifically, the operator 773-1 of switch 730-1 is generally rectangular with a height 732-1 and a width 731-1, and the corresponding height and width of the generally rectangular aperture 742-1 is the same as or slightly larger than the height 732-1 and width 731-1 of the operator 773-1. Likewise, the thickness of the parts of the body 741 that form the aperture 742-1 needs to be sufficiently large to block the movement of the operator 773-1.

Similarly, aperture 742-2 in the body 741 of the device 740 has a shape and size that prevents the operator 773-2 of switch 730-2 from moving at all. Specifically, the operator 773-2 of switch 730-2 is generally rectangular with a height 732-2 and a width 731-2, and the corresponding height and width of the generally rectangular aperture 742-2 is the same as or slightly larger than the height 732-2 and width 731-2 of the operator 773-2. Likewise, the thickness of the parts of the body 741 that form the aperture 742-2 needs to be sufficiently large to block the movement of the operator 773-2.

In this case, the thickness of the body 741 of the device 740 is sufficiently uniform along its entire length and width, but in some cases the thickness can vary. Also, the shape, size, and other characteristics of the aperture in the body of an example device can be configured to accommodate the particular operator of a switch. For example, if switch 730-1 is a rotary dial rather than a slide switch, then the aperture 742-1 receiving that operator 773-1 could be arc-shaped rather than rectangular-shaped.

As with the device 640 of FIGS. 6A and 6B, the device 740 of FIGS. 7a and 7B includes multiple (in this case, two) coupling features (in this case, apertures) that allow the device 740 to be coupled to the side wall 707 of the housing 705 of the light fixture 700. The coupling features of the device 740 are configured to complement coupling features (also apertures in this case) disposed in the side wall 707 of the housing 705. Disposed within each of the apertures in the device 740 and the side wall 707 of the housing 705 in this case is an additional coupling feature 745 (in this case, a fastening device, such as a screw or rivet). Each coupling feature 745 can be configured to be removable (e.g., a screw with a standard head). Alternatively, each coupling feature 745 can be configured to be permanently affixed (e.g., a rivet, a screw with a non-standard head). This latter case makes the device 740 tamper-proof, which prevents a user's removal of the device 740 to allow the user to move the operator 773-1 of switch 730-1 and/or the operator 773-2 of switch 730-2 beyond the range to which they are limited by the device 740.

Figure 8A:
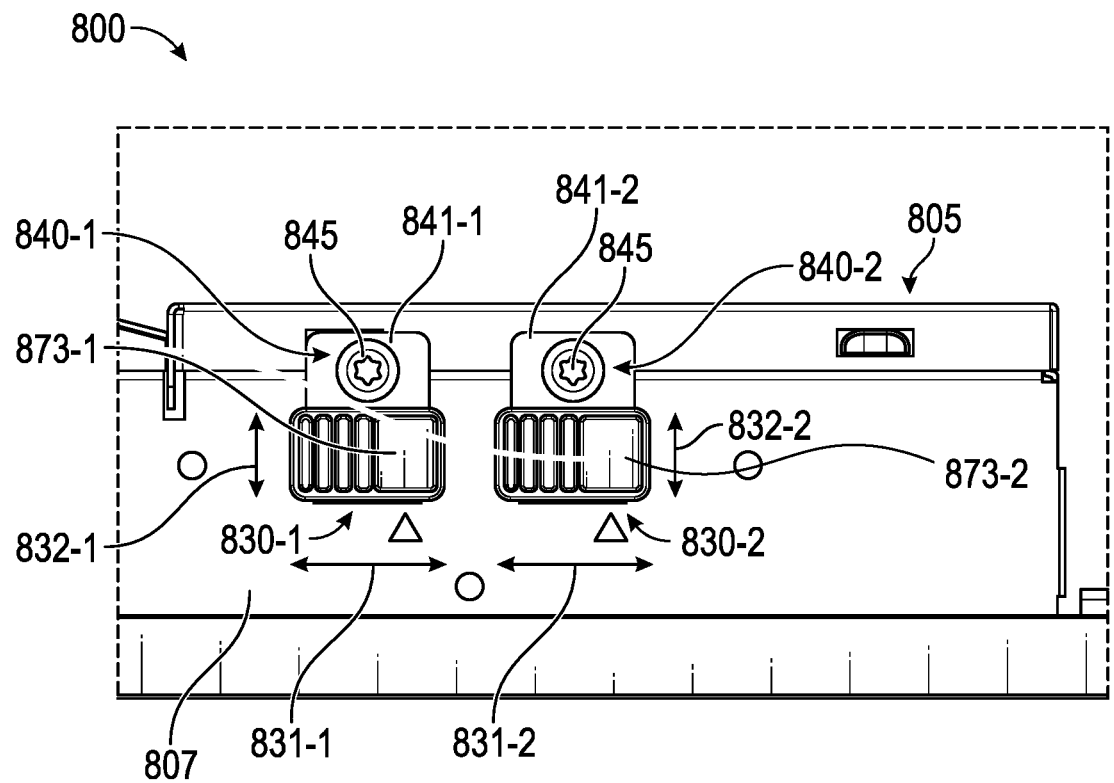
FIGS. 8A and 8B show a light fixture that includes yet other devices for limiting switch positions in accordance with certain example embodiments.
Figure 8B:
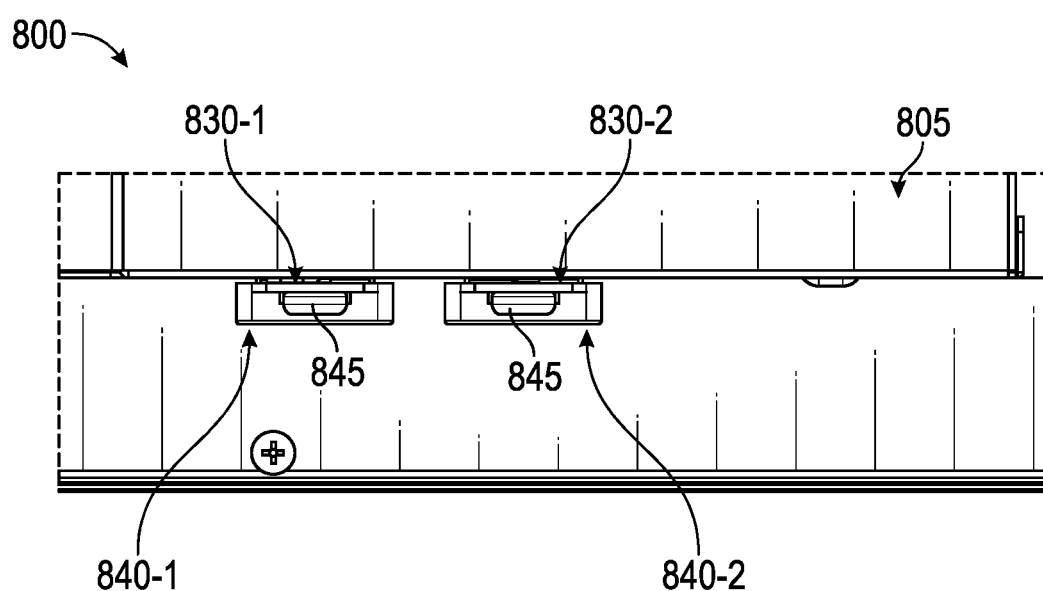

FIGS. 8A and 8B show a light fixture 800 that includes two other devices for limiting switch positions in accordance with certain example embodiments. Specifically, FIG. 8A shows a side view of a portion of the light fixture 800, and FIG. 8B shows a top view of a portion of the light fixture 800. Referring to FIGS. 1 through 8B, the light fixture 800 includes two switches (switch 830-1 and switch 830-2) disposed on a side wall 807 of the housing 805. In this case, switch 830-1 and switch 830-2 are disposed next to each other.

Switch 830-1 and switch 830-2 are configured substantially identically relative to each other and to the switches of FIGS. 6A through 7B. In this case, switch 830-1 and switch 830-2 are slide switches having multiple (e.g., three) discrete positions. Switch 830-1 can be used to control one aspect (e.g., lumen output) of the light fixture 800, and switch 830-2 can be used to control another aspect (e.g., CCT) of the light fixture 800.

The light fixture 800 of FIGS. 8A and 8B also includes two devices (device 840-1 and device 840-2) that are each used to limit the movement of the operator of a switch. Specifically, device 840-1 is used to passively limit the movement of the operator 873-1 of switch 830-1, and device 840-2 is used to passively limit the movement of the operator 873-2 of switch 830-2. In this case, device 840-1 and device 840-2 are each a cover having a body that completely covers the portions (e.g., operator 673-1, operator 673-2) of a switch that are exposed and otherwise accessible to a user.

Specifically, the body 841-1 of device 840-1 completely covers the operator 873-1 of switch 840-1, which prevents access by a user to the operator 673-1 of switch 630-1. Similarly, the body 841-2 of device 840-2 completely covers the operator 873-2 of switch 840-2, which prevents access by a user to and the operator 873-2 of switch 830-2. By preventing access to the respective operator that it covers, device 840-1 and device 840-2 indirectly (passively) limit the movement of the operator 873-1 of switch 830-1 and the operator 873-2 of switch 830-2 without physically and directly restricting the movement of operator 873-1 of switch 830-1 and the operator 873-2 of switch 830-2.

Each of device 840-1 and device 840-2 in this case includes a single coupling feature (in this case, an aperture) that allows the device to be coupled to the side wall 807 of the housing 805 of the light fixture 800. The coupling feature of device 840-1 and device 840-2 is configured to complement coupling features (also apertures in this case) disposed in the side wall 807 of the housing 805. Disposed within the aperture in the device 840 and the side wall 807 of the housing 805 in this case is an additional coupling feature 845 (in this case, a fastening device, such as a screw or rivet). Each coupling feature 845 can be configured to be removable (e.g., a screw with a standard head). Alternatively, each coupling feature 845 can be configured to be permanently affixed (e.g., a rivet, a screw with a non-standard head). This latter case makes the respective device tamper-proof, which prevents a user's removal of such device to allow the user access to the underlying switch.

In certain example embodiments, device 840-1 and/or device 840-2 are configured to be see-through or transparent, allowing a user to view switch 830-1 and switch 830-2 without being able to manipulate the operator 873-1 of switch 830-1 and the operator 873-2 of switch 830-2. In this way, the user can see the position in which the operator 873-1 of switch 830-1 and the operator 873-2 of switch 830-2 are set. Since the device 840 in this case acts as a cover, to the extent that a portion (e.g., the operator 873-1) of a switch 830-1 protrudes outward away from the side wall 807 of the housing 805, the body 841 of the device 840 can be configured (e.g., have corresponding protrusions, have an overall protrusion) to cover such outward-extending features of switch 830-1 and switch 830-2.

Figure 9:
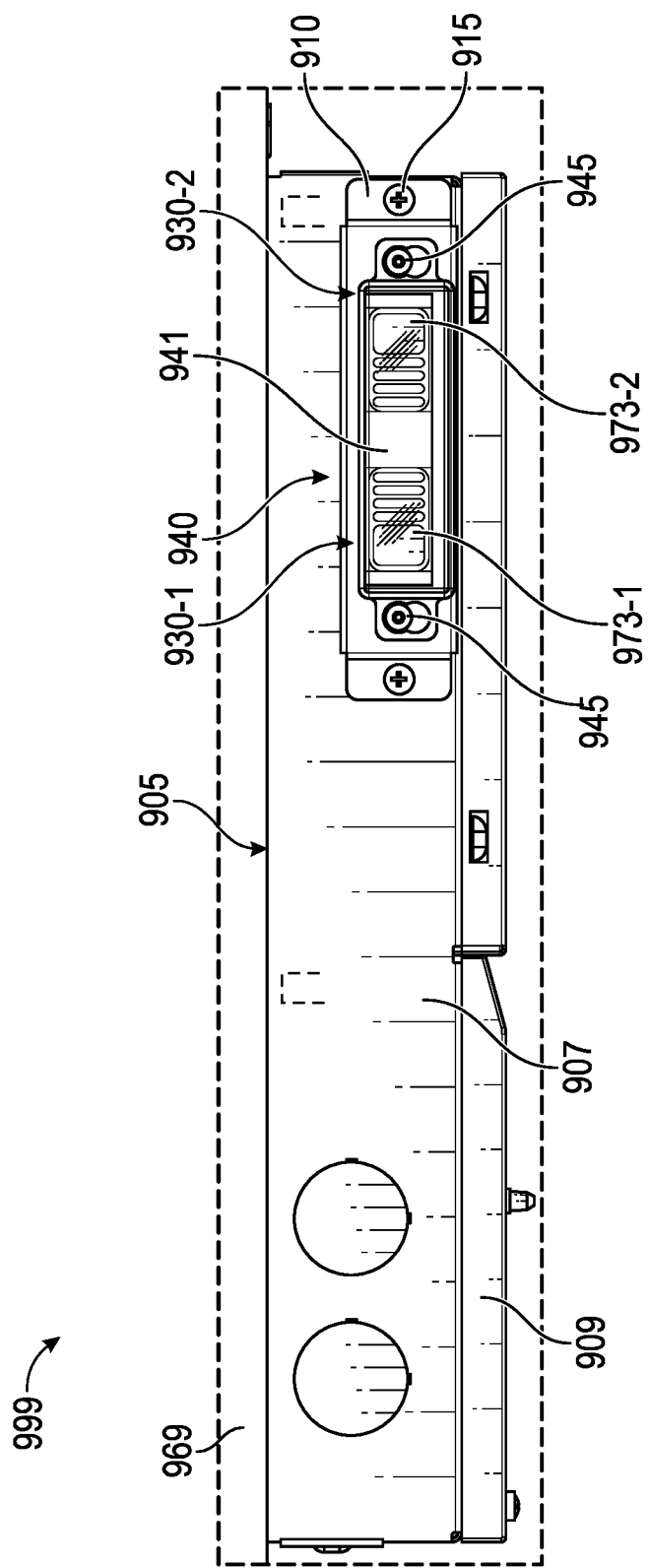
FIG. 9 shows a light fixture that includes another device for limiting switch positions in accordance with certain example embodiments.

FIG. 9 shows a side view of a light fixture 900 that includes another device 940 for limiting switch positions in accordance with certain example embodiments. Referring to FIGS. 1 through 9, the light fixture 900 of FIG. 9 is an under cabinet light fixture that is attached to the bottom of a cabinet 969. Coupled to the housing 905 of the light fixture 900 is a lens 909 through which light passes. The light fixture 900 includes two switches (switch 930-1 and switch 930-2) disposed indirectly on a side wall 907 of the housing 905. In this case, switch 930-1 and switch 930-2 are disposed next to each other. In this case, rather than being directly coupled to the side wall 907 of the housing 905, switch 930-1 and switch 930-2 are coupled to a plate 910, which is coupled to the side wall 907 of the housing 905 using one or more coupling features (e.g., apertures, fastening devices 915).

Switch 930-1 and switch 930-2 are configured substantially identically relative to each other and to the switches of FIGS. 6A through 8B. In this case, switch 930-1 and switch 930-2 are slide switches having multiple (e.g., three) discrete positions. Switch 930-1 can be used to control one aspect (e.g., lumen output) of the light fixture 900, and switch 930-2 can be used to control another aspect (e.g., CCT) of the light fixture 900.

The light fixture 900 also includes a single device 940 that is used to limit the movement of the operator 973-1 of switch 930-1 and the operator 973-2 of switch 930-2. In this case, the device 940 is a cover having a body 941 that completely covers the portions (e.g., operator 973-1, operator 973-2) of switch 930-1 and switch 930-2 that are exposed and otherwise accessible to a user. In other words, in this case, the device 940 prevents access by a user to the operator 973-1 of switch 930-1 and the operator 973-2 of switch 930-2, thereby indirectly (passively) limiting the movement of the operator 973-1 of switch 930-1 and the operator 973-2 of switch 930-2 without physically and directly restricting the movement of operator 973-1 of switch 930-1 and the operator 973-2 of switch 930-2.

The device 940 includes multiple (in this case, two) coupling features (in this case, apertures) that allow the device 940 to be coupled to the plate 910. The coupling features of the device 940 are configured to complement coupling features (also apertures in this case) disposed in plate 910, which is coupled to the side wall 907 of the housing 905. Disposed within each of the apertures in the device 940 and the plate 910 in this case is an additional coupling feature 945 (in this case, a fastening device, such as a screw or rivet). Each coupling feature 945 can be configured to be removable (e.g., a screw with a standard head). Alternatively, each coupling feature 945 can be configured to be permanently affixed (e.g., a rivet, a screw with a non-standard head). This latter case makes the device 940 tamper-proof, which prevents a user's removal of the device 940 to allow the user access to switch 930-1 and/or switch 930-2.

In certain example embodiments, the device 940 is configured to be see-through or transparent, allowing a user to view switch 930-1 and switch 930-2 without being able to manipulate the operator 973-1 of switch 930-1 and the operator 973-2 of switch 930-2. In this way, the user can see the position in which the operator 973-1 of switch 930-1 and the operator 973-2 of switch 930-2 are set. Since the device 940 in this case acts as a cover, to the extent that a portion (e.g., the operator 973-1) of a switch 930-1 protrudes outward from the plate 910, the body 941 of the device 940 can be configured (e.g., have corresponding protrusions, have an overall protrusion) to cover such outward-extending features of switch 930-1 and switch 930-2.

Figure 10:
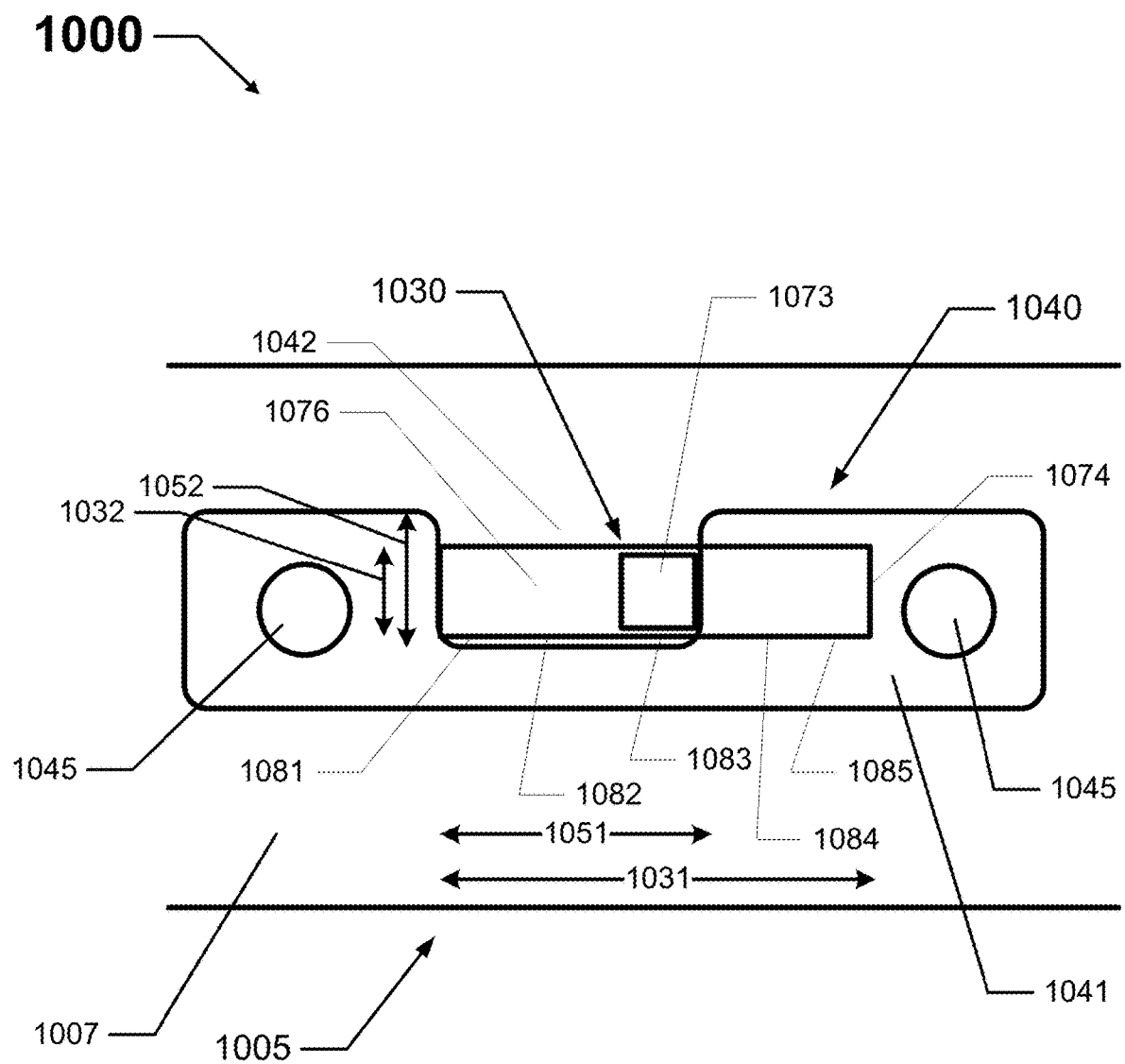
FIG. 10 shows a light fixture that includes a device for limiting switch positions in accordance with certain example embodiments.

FIG. 10 shows a light fixture 1000 that includes a device 1040 for limiting switch positions in accordance with certain example embodiments. Referring to FIGS. 1 through 10, the light fixture 1000 of FIG. 10 includes one switch 1030 disposed on a side wall 1007 of the housing 1005. The switch 1030 is a type of slide switch. Specifically, the actuator 1073 of the switch 1030 extends outward from a plate 1076. The plate 1076 is disposed underneath a slot 1074, and the actuator 1073 extends through the slot 1074 and can be accessible by a user.

The switch 1030 can include a number (in this case, five) of detents and/or other features to limit or create discrete stopping locations for the actuator 1073 (and so also the plate 1076) along the length of the slot 1074. Each of these detents and/or other features can be associated with a certain value of a variable that affects the operation of the light fixture to which the switch 1030 is coupled. For example, if the switch 1030 is used to select a CCT, the detent 1081 on the left end of the slot 1074 can be associated with 2700 K, detent 1082 can be associated with 3000 K, detent 1083 can be associated with 3500 K, detent 1084 can be associated with 4000 K, and the detent 1085 on the right end of the slot 1074 can be associated with 5000 K.

The light fixture 1000 also includes a single device 1040 that is used to limit the movement of the operator 1073 of the switch 1030. In this case, the device 1040 is a plate having a body 1041 that includes one aperture 1042 that traverses the body 1041 of the device 1040. The aperture 1042 has disposed therein the operator 1073 of the switch 1030. The aperture 1042 in this case is located along the top edge of the body 1041 of the device 1040, so that the aperture 1042 is open ended at the top.

The shape and size of an aperture 1042 is designed to perform the function of limiting (in this case, actively) the movement of the operator 1073 of the switch 1030 so that only detent 1081, detent 1082, and detent 1083 are the only selections of the operator 1073 that are available to a user. In other words, because of the configuration of the device 1040 relative to the switch 1030, the operator 1073 cannot be moved to detent 1084 or detent 1085. So, while the device 1040 allows access by a user to the operator 1073 of the switch 1030, the device 1040 actively (physically) restricts (limits) the movement of the operator 1073 of the switch 1030.

In this case, aperture 1042 in the body 1041 of the device 1040 has a shape and size that prevents the operator 1073 of the switch 1030 from moving at all. Specifically, the operator 1073 of the switch 1030-1 is generally rectangular with a height 1032 and a width 1031. Further, the height 1052 of the generally rectangular aperture 1042 is larger than the height 1032 of the operator 1073, and the width 1051 of the aperture 1042 is less than the width 1031 of the operator 1073. Likewise, the thickness of at least some of the parts of the body 1041 that form the aperture 1042 needs to be sufficiently large to block the movement of the operator 1073.

In some cases, a device may need some slight adjustment or modification in order to effectively limit the movement of an operator of a switch. For example, the size of an actuator or other parts of a switch can vary, requiring a larger or smaller aperture (e.g., aperture 1042) in the device. As another example, a light fixture installed in certain jurisdictions may allow for a larger number of selections by an actuator of a switch compared to other jurisdictions. In these and other cases, there can be a need to have an example device that is configurable.

Figure 11:
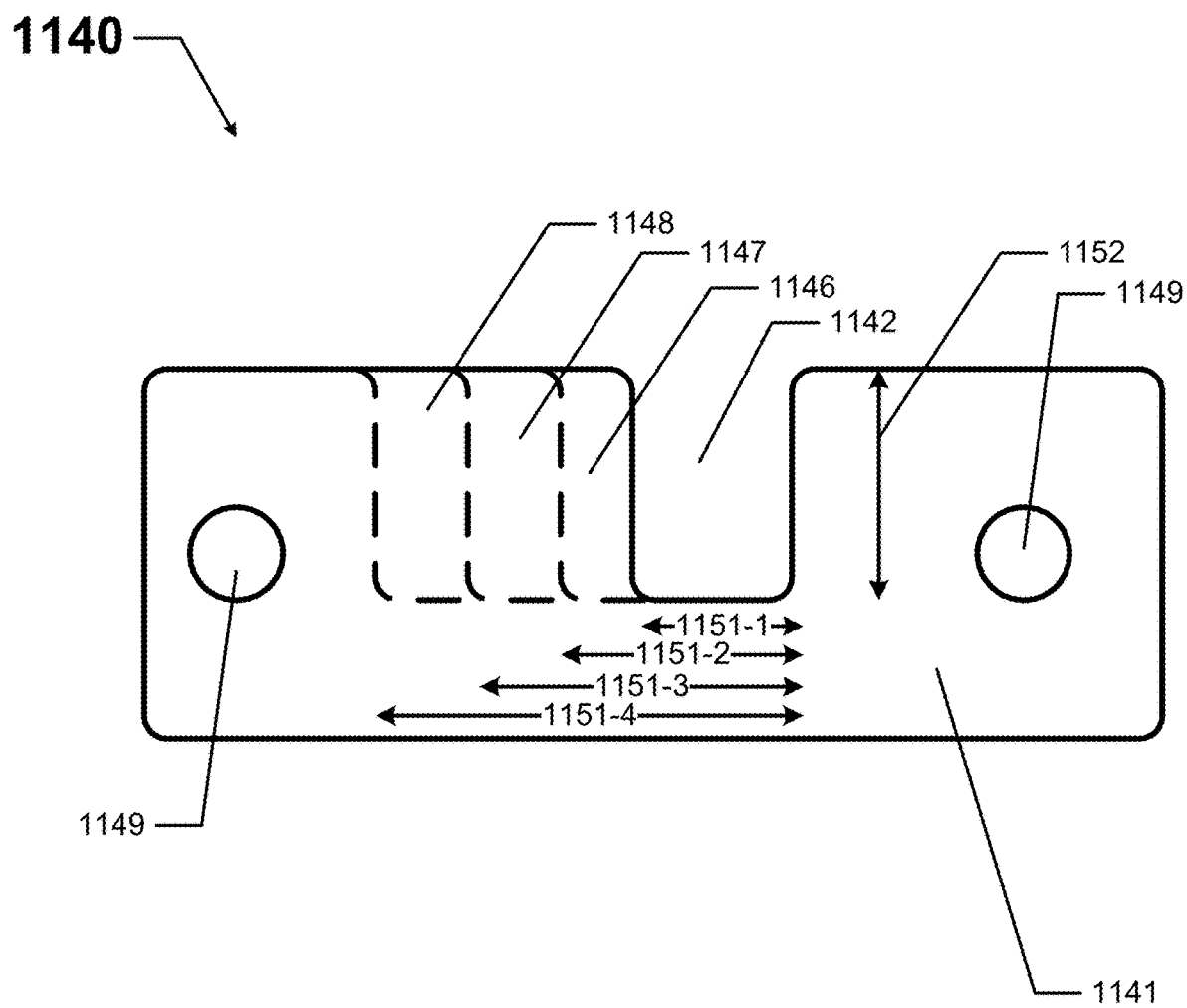
FIG. 11 shows a configurable device for limiting switch positions in accordance with certain example embodiments.

FIG. 11 shows a device 1140 for limiting switch positions in accordance with certain example embodiments. Referring to FIGS. 1 through 11, the device 1140 of FIG. 11 is configurable. In this case, the device 1140 is a plate having a body 1141 that includes one aperture 1142 that traverses the body 1141 of the device 1140. The aperture 1142 is substantially rectangular in shape, having a height 1152 and a width 1151-1. The aperture 1142 in this case is located along the top edge of the body 1141 of the device 1140, so that the aperture 1142 is open ended at the top.

In the event that the aperture 1142 is not wide enough (e.g., the width 1151-1 is too small to fit the operator of a switch, the width 1151-1 is too small relative to the range of selections by the operator of a switch permitted in a certain jurisdiction), the body 1141 of the device 1140 can be modified to allow for a larger width of the aperture 1142. In this case, the body 1141 includes a number of consecutive knock-out segments that are positioned along the left side of the aperture 1142.

Specifically, knock-out segment 1146 form the left edge of the aperture 1142. If knock-out segment 1146 is removed, then the aperture 1142 has a new width of 1151-2, and the left edge of the resulting aperture 1142 is defined by knock-out segment 1147. If knock-out segment 1147 is also removed, then the aperture 1142 has a new width of 1151-3, and the left edge of the resulting aperture 1142 is defined by knock-out segment 1148. If knock-out segment 1148 is also removed, then the aperture 1142 has a new width of 1151-4, and the left edge of the resulting aperture 1142 is defined by the body 1141.

Other adjustments and/or configurations of the device 1140 can additionally or alternatively be used. For example, rather than having only two coupling features 1149 (in this case, apertures that traverse the thickness of the body 1141), the device 1140 can have more than two coupling features 1149 located at various points on the body 1141. As another example, there can additionally or alternatively be horizontally-oriented knock-out segments at the bottom of the aperture 1142 to adjust the height 1152 of the aperture 1142.

Example devices can also be configurable in other ways. For example, a device can have a body that is made of multiple pieces that are movable (e.g., slidable, foldable) with respect to each other. As another example, the body of an example device can be made of multiple pieces that are coupled to each other in any of a number of positions and/or orientations. In this way, a user can customize the shape, location, and other characteristics of an aperture in an example device. Alternatively, an example device can be manufactured for a specific electrical device (e.g., a light fixture) having a specific switch disposed at a specific location on and having a specific orientation with respect to the electrical device.

In one or more example embodiments, the devices described herein can be used for limiting the movement of operators of switches for light fixtures (or other electrical devices). Example embodiments can be used for one or more of any of a number of reasons, including but not limited to compliance with applicable codes and/or regulations, demand response, energy efficiency, prevention of tampering by others (e.g., children), and surety of preferred settings. Example embodiments can be made in a fixed form. Alternatively, example embodiments can be configurable to adapt to specific conditions and/or preferences. Using example embodiments described herein can improve customer satisfaction and ease of use with respect to a light fixture or other electrical device.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A device for preventing movement of an operator of at least one switch of a light fixture, the device comprising:
a device body having at least one coupling aperture that traverses a thickness of the device body; and
at least one fixture coupling feature disposed in the at least one coupling aperture in the device body, wherein the at least one fixture coupling feature is configured to fixedly couple to at least one device coupling feature disposed on a light fixture body of the light fixture, wherein the at least one fixture coupling feature has a non-standard head requiring a specialized tool for decoupling the at least one fixture coupling feature from the light fixture body,
wherein the device body, when fixedly coupled to the light fixture body, is configured to prevent the movement of a first operator of a first switch of the at least one switch disposed on the light fixture body without preventing access to any other component of the light fixture disposed on the light fixture body,
wherein the light fixture body is configured to house at least one light source that emits light to provide general illumination.

2. The device of claim 1, further comprising:
a first operator aperture that traverses the device body, wherein the first operator aperture is configured to have disposed therethrough the first operator of the first switch when the at least one fixture coupling feature is disposed in the at least one coupling aperture in the device body and coupled to the at least one device coupling feature, wherein the device body that forms the first operator aperture is configured to prevent the movement of the first operator of the first switch.

3. The device of claim 2, wherein the device body comprises at least one knock-out segment that can be removed to enlarge the first operator aperture to have the first operator disposed therethrough.

4. The device of claim 2, wherein the device body comprises multiple pieces that are coupled to each other in a first configuration to result in a first shape and a first size of the first operator aperture, and wherein the multiple pieces, when coupled to each other in a second configuration, form the first operator aperture having a second shape and a second size.

5. The device of claim 2, further comprising:
a second operator aperture that traverses the device body, wherein the second operator aperture is configured to have disposed therethrough a second operator of a second switch of the at least one switch when the at least one fixture coupling feature is disposed in the at least one coupling aperture in the device body and coupled to the at least one device coupling feature,
wherein the second switch is disposed on the light fixture body,
wherein the device body that forms the second operator aperture is configured to prevent a second movement of the second operator of the second switch.

6. The device of claim 1, wherein the at least one device coupling feature of the light fixture comprises at least one additional coupling aperture that aligns with the at least one coupling aperture of the device body.

7. The device of claim 1, wherein the device body comprises a transparent material.

8. The device of claim 1, wherein the first operator of the first switch of the light fixture is inaccessible at any time when the at least one fixture coupling feature is coupled to the at least one device coupling feature.

9. A light fixture comprising:
an enclosure comprising at least one enclosure wall and at least one first device coupling feature, wherein the at least one enclosure wall houses at least one light source that provides general illumination;
a first switch disposed on the at least one enclosure wall, wherein the first switch comprises a first operator, wherein the first switch controls a first output characteristic of the light emitted by the at least one light source; and
a first device coupled to the at least one enclosure wall, wherein the first device comprises:
a first body having at least one coupling aperture that traverses a thickness of the first device body; and
at least one first enclosure coupling feature disposed in the at least one coupling aperture in the first body, wherein the at least one first enclosure coupling feature fixedly couples to the at least one first device coupling feature of the enclosure, wherein the at least one first enclosure coupling feature has a non-standard head requiring a specialized tool for coupling the at least one first enclosure coupling feature to the at least one first device coupling feature and for decoupling the at least one first enclosure coupling feature from the at least one first device coupling feature,
wherein the first body prevents movement of the first operator of the first switch without preventing access to any other non-switch component of the light fixture disposed on the enclosure.

10. The light fixture of claim 9, wherein the enclosure is a housing inside of which is disposed at least one light source.

11. The light fixture of claim 9, wherein the enclosure is at least one of a group consisting of a junction box and a connector integrated with an electrical cable.

12. The light fixture of claim 9, further comprising:
a second switch disposed on the at least one enclosure wall, wherein the first body of the first device, when coupled to the enclosure, further prevents a second movement of a second operator of the second switch, wherein the second switch controls a second output characteristic of the light emitted by the at least one light source.

13. The light fixture of claim 9, further comprising:
a second switch disposed on the at least one enclosure wall; and
a second device coupled to the at least one enclosure wall, wherein the second device comprises:
a second body having at least one additional coupling aperture that traverses a thickness of the second device body; and
at least one second enclosure coupling feature disposed in the at least one additional coupling aperture in the second body, wherein the at least one second enclosure coupling feature fixedly couples to at least one second device coupling feature of the enclosure, wherein the at least one second enclosure coupling feature has the non-standard head requiring the specialized tool for coupling the at least one second enclosure coupling feature to at least one second device coupling feature disposed in the enclosure and for decoupling the at least one second enclosure coupling feature from the at least one second device coupling feature,
wherein the second body prevents a second movement of the second operator of the second switch.

14. The light fixture of claim 9, wherein the first device further comprises an operator aperture that traverses the first body, wherein the operator aperture has disposed therethrough the first operator of the first switch when the at least one first enclosure coupling feature is disposed in the at least one coupling aperture in the first body and coupled to the at least one first device coupling feature, wherein the first body that forms the operator aperture is configured to prevent the first movement of the first operator of the first switch.

15. The light fixture of claim 14, wherein the operator aperture comprises at least one open side.

16. The light fixture of claim 14, further comprising:
a second switch disposed on the at least one enclosure wall, wherein the second switch comprises a second operator, wherein the first body, when coupled to the enclosure, further prevents a second movement of the second operator of the second switch.

17. The light fixture of claim 9, wherein the first device further comprises an additional operator aperture that traverses the first body, wherein the additional operator aperture has disposed therethrough the second operator of the second switch when the at least one first enclosure coupling feature is disposed in the at least one coupling aperture in the first body and coupled to the at least one first device coupling feature, wherein the first body that forms the additional operator aperture is configured to prevent the second movement of the second operator of the second switch.

18. A light fixture comprising:
an enclosure comprising at least one enclosure wall, wherein the at least one enclosure wall houses at least one light source that provides general illumination;
a switch disposed on the at least one enclosure wall, wherein the switch comprises an operator, wherein the switch controls an output characteristic of the light emitted by the at least one light source;
a device permanently and fixedly coupled to the at least one enclosure wall, wherein the device comprises a body; and
at least one tamper-proof coupling feature that permanently and fixedly couples the device to the at least one enclosure wall,
wherein the body of the device prevents movement of the operator of the switch.

19. The light fixture of claim 18, wherein the at least one tamper-proof coupling feature comprises a rivet.

\* \* \* \* \*